Oct. 3, 1967   J. F. QUAAS ETAL   3,345,495
TUBULAR CUTTING ELECTRODE
Filed July 25, 1963

INVENTORS
Joseph F. Quaas
Charles E. Rogers
BY Connolly and Hutz
ATTORNEYS 3,345,495
TUBULAR CUTTING ELECTRODE
Joseph F. Quaas, Island Park, and Charles E. Rogers, Bayside, N.Y., assignors to Eutectic Welding Alloys Corporation, Flushing, N.Y., a corporation of New York
Filed July 25, 1963, Ser. No. 297,503
4 Claims. (Cl. 219—146)

ABSTRACT OF THE DISCLOSURE

A tubular metallic arc electrode having a mild steel tube with an outer diameter of about 3/32 to 5/16 inch and a wall thickness of about 0.010 to 0.030 inch, and a core within the tube consisting essentially of ferrous carbonate, the core ranging approximately from 27 to 30% by weight of a cross-sectional unit of the electrode.

---

This invention relates to a tubular flux cored metallic arc cutting electrode, and it more particularly relates to such an electrode especially well suited for semi and fully automatic processes.

U.S. Patent 2,761,796 describes a metallic arc electrode for performing various cutting functions such as gouging and chamfering. An object of this invention is to provide a highly efficient type of cutting electrode that is particularly well suited for semi and fully automatic operation.

In accordance with this invention, a flux core incorporating from 75 to 100% by weight of ferrous carbonate is incorporated within a mild steel tube having a wall thickness ranging from ten to thirty thousandths of an inch and an outside diameter ranging from 3/32 up to 5/16 inch. The flux core ranges approximately from 27 to 30% by weight of a cross-sectional unit of the tube. Such an electrode provides remarkably efficient and rapid cutting action. The bare tube is essentially used in semi and automatic processes. However an arc stabilizing flux coating is applied to the tube to suit it for manual use in stick form. It is also possible to incorporate in the core up to 25% by weight of deoxidizing agents such as silicon, manganese and titanium or fluxing material, such as $TiO_2$, $SiO_2$ and various fluorides and binders (such as water soluble silicates) or organic plastics, such as polyethylene, acrylic, or Bakelite.

Novel features and advantages of the present invention will become apparent to one skilled in the art from a reading of the following description in conjunction with the accompanying drawings wherein similar reference characters refer to similar parts and in which.

Figure 1:
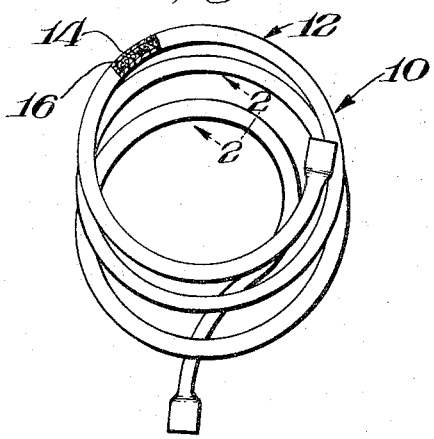
FIG. 1 is a three-dimensional view of one embodiment of this invention.
Figure 2:
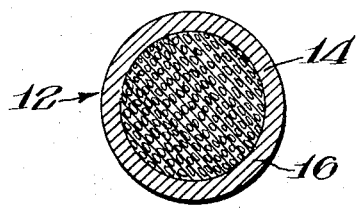
FIG. 2 is a cross-sectional view taken through FIG. 1 along the line 2—2.

In FIGS. 1 and 2 is shown a coil 10 of a tubular metallic arc electrode 12 for semi or fully automatic processes. The illustrated cutting electrode 12 has for example an outside diameter of 7/64 inch, and its tube 14 is made of mild, low carbon steel, such as 1030 type steel. The wall thickness of tube 14 of electrode 12 is approximately 0.010 inch. Core 16 is for example substantially ferrous carbonate. Electrode 12 is fabricated for example by forming a strip of type 1030 steel tape 0.012 inch thick and 0.475 inch wide into a U-shaped trough feeding it through successive forming rollers. Flux core 16 is fed into the trough, and later forming stations gradually close the tape into a round tube. Tube 12 is drawn to size, for example 7/64 inch O.D.; and it incorporates, for example 28% by weight of ferrous carbonate flux per cross-sectional unit.

Core 16 may incorporate up to 25% by weight of other materials than ferrous carbonate, such as a combination of deoxidizers including silicon (Si), manganese (Mn), or titanium (Ti) and refluxing materials such as titanium dioxide ($TiO_2$), silicon dioxide ($SiO_2$) or various fluorides, such as of the active metal type including sodium, potassium, and calcium fluorides.

Bare tubular electrode 12 is utilized in automatic or semi-automatic processes in coils, spools or pay-off packs. It provides remarkably efficient cutting, chamfering and gouging action at extremely high current densities ranging from 500 to 600 amperes for a 7/64 inch O.D. tube. The applied current varies with tube size. Such an electrode operated accordingly removes over 13½ pounds of a metal, such as mild steel, per pound of electrode consumed, which is at least twice the removal rate of any heretofore available electrode for similar service operated under the same conditions.

Figure 3:
FIG. 3 is a three-dimensional view of a manual form of the electrode shown in FIG. 1.
Figure 4:
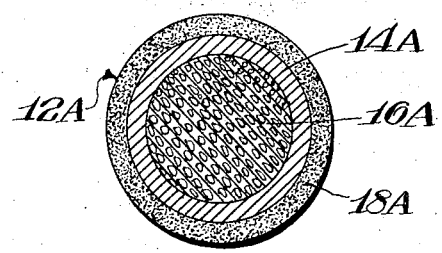
FIG. 4 is a cross-sectional view taken through FIG. 3 along the line 4—4.

FIG. 3 and 4 show a flux-coated tube 12A which is similar to tubular electrode 12 shown in FIGS. 1 and 2 with the exception that it is made in stick form for manual use and fluxed. Its flux coating 18A incorporates arc stabilizers such as iron oxide (either in the form of $Fe_2O_3$ or $Fe_3O_4$), alkaline earth carbonates and titanium dioxide employing water soluble silicates on the binder.

Outer flux coating 18A ranges for example from 20 to 35% by weight of the resultant electrode. A specific example includes 30% by weight of outer flux coating of the resultant electrode with other portions the same as the electrode 12 shown in FIGS. 1 and 2 with the outer flux coating consisting of the following: 20% iron oxide, 20% alkaline earth carbonates, 20% titanium dioxide and 20% water soluble silicates.

What is claimed is:

1. A tubular metallic arc electrode comprising a mild steel tube having an outside diameter ranging approximately from 3/32 to 5/16 inch and a wall thickness ranging approximately from 0.010 to 0.030 inch, a core consisting essentially of the following constituents in the indicated percentages by weight of the core:

| Constituent: | Range |
| --- | --- |
| Ferrous carbonate | 75–100 |
| Deoxidizers | 0–25 |
| Fluxing material and binder | 0–25 | and said core ranging approximately from 27 to 30% by weight of a cross-sectional unit of said electrode.

2. An electrode as set forth in claim 1 wherein substantially 100% of said ferrous carbonate is incorporated in said core.

3. An electrode as set forth in claim 1 wherein the outside diameter of said tube is approximately 7/64 inch, and the wall thickness of said tube ranges approximately from 0.010 to 0.015 inch.

4. An electrode as set forth in claim 1 having an outer flux incorporating arc stabilizers whereby it is adapted for manual application.

References Cited

UNITED STATES PATENTS

| | | | |
|---|---|---|---|
| 1,525,840 | 2/1925 | Weed | 219—146 |
| 2,531,005 | 11/1950 | Smith | 219—146 |
| 2,761,796 | 9/1956 | Wasserman | 219—146 X |
| 2,818,352 | 12/1957 | Ludwig et al. | 219—146 X |

RICHARD M. WOOD, *Primary Examiner.*

R. F. STAUBLY, *Assistant Examiner.*

UNITED STATES PATENT OFFICE
CERTIFICATE OF CORRECTION

Patent No. 3,345,495                                          October 3, 1967

Joseph F. Quaas et al.

It is hereby certified that error appears in the above numbered patent requiring correction and that the said Letters Patent should read as corrected below.

Column 1, line 44, for "material" read -- materials --; column 2, line 17, for "refluxing" read -- fluxing --; line 33, for "FIG." read -- FIGS. --.

Signed and sealed this 5th day of November 1968.

(SEAL)
Attest:

Edward M. Fletcher, Jr.                                      EDWARD J. BRENNER
Attesting Officer                                                  Commissioner of Patents